United States Patent [19]

Hsieh et al.

[11] Patent Number: 5,666,177
[45] Date of Patent: Sep. 9, 1997

[54] BLACK MATRIX FOR LIQUID CRYSTAL DISPLAY

[75] Inventors: Ting-Chiang Hsieh, Hsinchu; Dong-Yuan Goang, Tao-Yuan, both of Taiwan

[73] Assignee: Industrial Technology Research Institute, Hsinchu, Taiwan

[21] Appl. No.: 606,954

[22] Filed: Feb. 26, 1996

[51] Int. Cl.$^6$ .................... G02F 1/1333; G02F 1/1335
[52] U.S. Cl. ............................................ 349/111; 349/106
[58] Field of Search ........................... 359/67, 68, 63; 349/111, 110, 106

[56] References Cited

U.S. PATENT DOCUMENTS

| 5,161,043 | 11/1992 | Narutaki et al. | 359/67 |
| 5,307,189 | 4/1994 | Nishiki et al. | 359/59 |
| 5,369,513 | 11/1994 | Akatsuka et al. | 359/67 |
| 5,489,621 | 2/1996 | Sato et al. | 572/75 |
| 5,495,354 | 2/1996 | Jo | 359/67 |
| 5,498,498 | 3/1996 | Uchikawa et al. | 430/7 |

FOREIGN PATENT DOCUMENTS

| 56-27114 | 3/1981 | Japan | 359/67 |
| 62-250416 | 10/1987 | Japan | 359/67 |
| 2-306222 | 12/1990 | Japan | 359/67 |

OTHER PUBLICATIONS

"Process In Color Filters For LCDs" by M. Tani et al, pub by Toppan Printing Co, pp. 103–111.

S. Yachi et al, "An Analysis of Source–Common Coupling Effect in Large–Area TFT–LCDs" SID '91 Digest, pp. 30–33.

Primary Examiner—William L. Sikes
Assistant Examiner—Tiep H. Nguyen
Attorney, Agent, or Firm—George O. Saile

[57] ABSTRACT

A liquid crystal display having improved contrast has been developed by providing a black matrix comprising two layers, a metallic underlayer and a top layer of resin in which particles of black pigment have been dispersed. Additionally, said resin is photosensitive so, after exposure to an image having the shape of the desired black matrix, it assumes the form of the black matrix after development. It is then used as a mask during the etching of the underlying metallic layer. The presence of the resin greatly reduces the reflectivity of the black matrix, thereby increasing the contrast level of the overall display, while the underlying metallic layer provides a solid base for it to rest on.

7 Claims, 3 Drawing Sheets

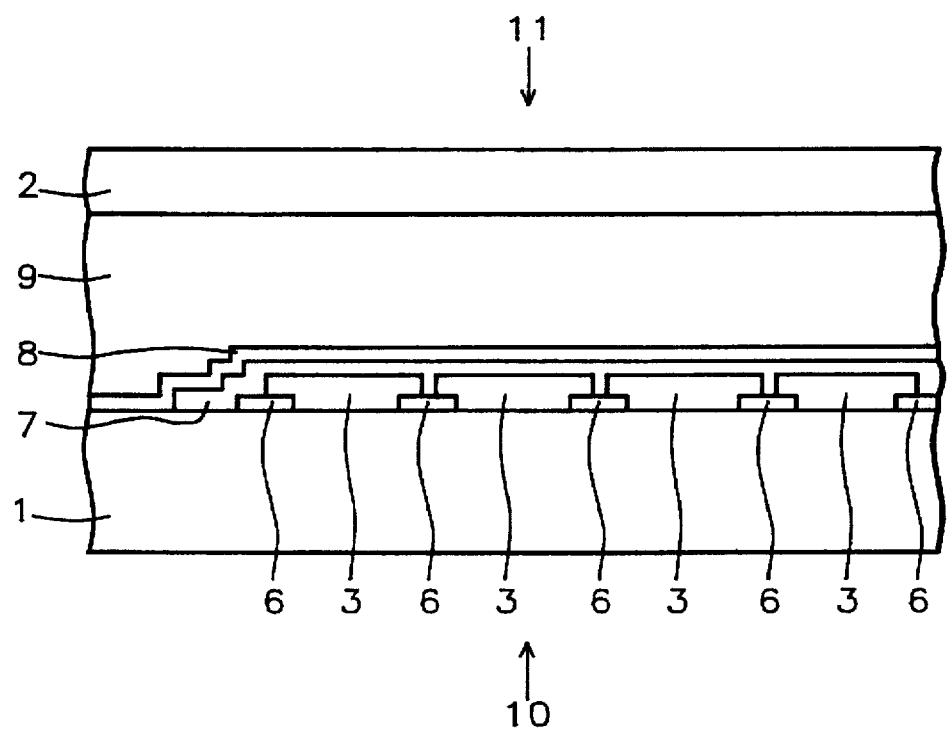
*FIG. 1 — Prior Art*
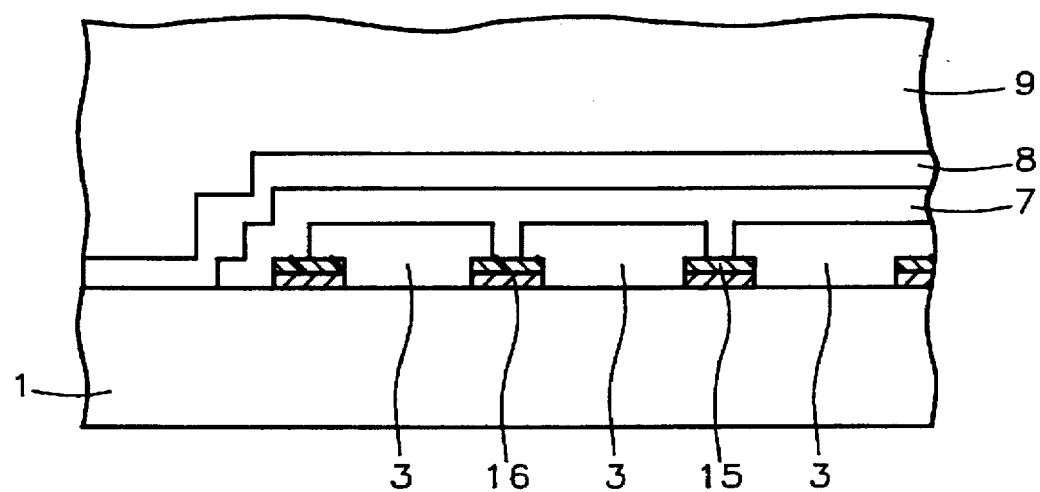
*FIG. 2* ing to 5,666,177

BLACK MATRIX FOR LIQUID CRYSTAL DISPLAY

BACKGROUND OF THE INVENTION (1) Field of the Invention

The invention relates to the general field of Liquid Crystal Displays, more particularly to the design of the black matrix.

(2) Description of the Prior Art

Referring to FIG. 1, the basic parts of a liquid crystal display are schematically illustrated in cross-section. A number of layers are involved, the outermost being a pair of crossed polarizers (not shown). In their most commonly used configuration, the polarizers are arranged so as to have their optic axes orthogonal to one another. That is, in the absence of anything else between them, light passing through the entrance polarizer would be blocked by the exit polarizer, and vice versa.

Immediately below the entrance polarizer is an upper transparent insulating substrate 2 (usually glass) and immediately above the exit polarizer is a similar lower substrate 1. Conducting lines (also not shown), running orthogonal to, and insulated from, one another are located on the lower surface of 2. Said orthogonal lines are connected at their intersections through Thin Film Transistors (TFTs). The TFTs allow voltage, separately applied to a set of orthogonal lines, to be added together only at the intersecting position which will overlie a given pixel of the display.

Sandwiched between, and confined there by means of suitable enclosing walls (not shown), is a layer of liquid crystal. Liquid crystals comprise long molecules, called nematics. The orientation of these molecules, relative to a given surface can be controlled by coating such a surface with a suitable orientation layer (not shown) and rubbing said orientation layer in the desired direction just prior to bringing it into contact with the liquid crystals.

Thus, in FIG. 1, the molecules closest to upper substrate 2 might be oriented so as to lie in the plane of the figure while the molecules closest to lower substrate 1 would be oriented to lie perpendicular to this plane. Molecules in between the two sets of pre-oriented molecules then arrange themselves so as to gradually change their orientations between these two extremes. Hence the term 'twisted nematic' (TN) for such a configuration. A TN is optically active and will rotate the plane of any polarized light that traverses it.

Thus, polarized light that was formed and oriented as a result of passing through an entrance polarizer will be rotated though an angle of 90° after traversing layer 9 and so will be correctly oriented to pass through the exit polarizer. Such a device is therefore normally on (transmits light).

An important property of TN is that, in the presence of an electric field (typically about 5,000 volts/cm.), normal to the the molecules, said molecules will all orient themselves so as to point in the same direction and the liquid crystal layer will cease to be optically active. As discussed above, a single pair of orthogonal lines comprise one electrode for generating said electric field, the other being transparent conducting common electrode 8, usually comprising indium-tin-oxide (ITO). Located between common electrode 8 and the pixels is overcoat layer 7.

To view a display of the type illustrated in FIG. 1, light may be applied from above the entrance polarizer, in direction 11, and then viewed from below the exit polarizer from direction 10, or a reflecting surface may be applied to the lower surface of the exit polarizer and the device viewed from above.

An important feature of LCDs is the black matrix, a cross-section of which has been designated 6 in FIG. 1. As can be seen, it is located at the spaces between sub-pixels 3. Its purpose is to block light that is extraneous to the display that would otherwise emerge on the viewing side of substrate 1, and thereby reduce the overall contrast.

Blockage of the undesired light by the black matrix occurs (in prior art) as a consequence of the reflection of incoming light, the conventional black matrix comprising a reflective metal layer such as chromium. While most of such reflected light never finds its way into the final image, some of it will, inevitably, get turned around, through scattering and through reflection at one or more of the several optical interfaces internal to the LCD, and end up contributing to the final image, thereby reducing its contrast level.

Attempts have been made in the prior art to reduce this unwanted reflection by the black matrix by coating it with a layer of light absorbing material such a polymer or an oxide, but this method is only partially effective, often allowing in excess of 3% of such light to dilute the final image.

Nishinski et al. (U.S. Pat. No. 5,307,189 April 1994) propose a solution to this unwanted light reflection problem wherein the black matrix, instead of comprising a metal such as chromium, comprises instead a photosensitive resin in which a black pigment has been dispersed. This choice of material has the advantage of effectively eliminating all reflection by the black matrix and, in principle, simplifying the overall manufacturing process since a separate layer of photoresist is no longer needed, the black matrix being formed directly from the resin layer after exposure and development.

Several disadvantages to this structure and method, as described by Nishinski et al, will now be considered:

Since a material comprising a photosensitive resin in which a black pigment has been dispersed will, by definition, severely limit the penetration of light, such a layer could have limited mechanical integrity. Furthermore, if the layer is inadvertently made too thick, the portion closest to the substrate will be under-exposed (or not exposed) and would be subject to unintended removal during development.

In general, polymer films do not adhere as well to glass substrates as do metallic films such as chromium.

A black matrix comprising only resinous material would not be electrically conductive. This is a disadvantage in applications where the black matrix is used to lower the series resistance of, for example, the common electrode.

SUMMARY OF THE INVENTION

It has been an object of the present invention to provide a black matrix for a Liquid Crystal Display that gives improved contrast relative to similar displays based on the current art.

Yet another object of the present invention has been to provide a cost effective method for manufacturing said black matrix.

These objects have been achieved by providing a black matrix comprising two layers, a metallic underlayer and a top layer of resin in which particles of black pigment have been dispersed. Additionally, said resin is photosensitive so, after exposure to an image having the shape of the desired black matrix, it assumes the form of the black matrix after development. It may then be used as an etch mask during the etching of the underlying metallic layer. The presence of the resin greatly reduces the reflectivity of the black matrix, thereby increasing the contrast level of the overall display, while the underlying metallic layer provides a solid base for it to rest on.

BRIEF DESCRIPTION OF THE DRAWINGS

FIG. 1 is a schematic cross-section of part of a Liquid Crystal Display exemplifying the current art.

FIG. 2 shows an improved black matrix as taught by the present invention.

DESCRIPTION OF THE PREFERRED EMBODIMENTS

Figure 3A:
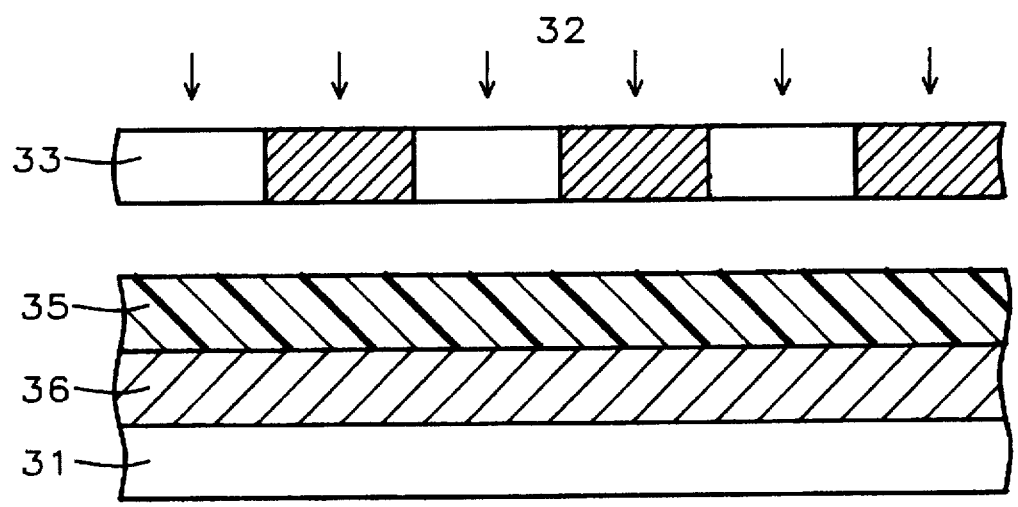
FIGS. 3 (a)–(c) illustrate steps in a method for manufacturing the black matrix of the present invention.

Referring now to FIG. 2, we show there a schematic cross-section of an embodiment of the present invention. For ease of reference, we have retained the same numbers for some of the sub-components as were used in FIG. 1, since these have not been changed.

In a color display, sub-pixels such as 3, would comprise individual small color filters for, for example, green, blue and red light. They are evenly distributed over the surface of transparent insulating substrate 1 and are covered by overcoat layer 7 comprising polyimide. The thickness of overcoat layer 7 is typically between about 1 and 3 microns. Common electrode 8, comprising ITO, has been deposited over layer 7 to a thickness that is between about 0.1 and 0.3 microns.

The black matrix has been formed on the upper surface of lower substrate 1. Said black matrix comprises two layers: a metal bearing layer (hereinafter to be referred to as a metallic layer) 16, such as chromium, aluminum, or chromium oxide, between about 200 and 2,000 Angstroms thick, and a layer 15 of a photosensitive resin such as polyimide or polyacrylic, in which particles of a black pigment such as carbon black or a mixture of red, green, and blue pigments in a size range between about 0.01 and 0.1 microns, have been dispersed. The thickness of the resin layer is between about 0.5 and 1 microns and it has been patterned and etched so as to leave the sub-pixels essentially unblocked, while blocking the areas that separate the sub-pixels one from another. The complete LCD includes additional structures such as an upper substrate (not shown) on whose lower surface have been formed the means for generating an electric field normal to said lower surface and confining it to a single sub-pixel, a layer of liquid crystal 9 between the two substrates, and entrance and exit polarizers (not shown).

We describe now an effective method for manufacturing the above described structures:

Referring to FIG. 3(a), a metallic layer 36 comprising chromium, aluminum, or chromium oxide is deposited onto transparent insulating substrate 31 to a thickness between about 1,000 and 3,000 Angstroms. Although all three of these materials allow the invention to operate effectively, we have generally preferred to use chromium because it is easier to deposit and etch. It ia also possible to use a combination of chromium and chromium oxide. Chromium has a reflectivity of about 70% while that of its oxide is between 50 and 60%. Therefore, if chromium oxide is used, the black matrix may be somewhat thinner than if chromium is used. Thus, depending on the application, the thickness and optical properties of the black matrix may be adjusted by controlling the composition and thickness of the undercoat (see table I below).

A layer of photosensitive resin 35 such as polyimide or polyacrylic is then applied over metallic layer 36 to a thickness between about 0.1 and 1 microns. The method of application of the resin has typically been spin coating but similar methods, such as dipping or spraying could be used without departing from the spirit of the invention.

Prior to the application of resin 35, a black pigment comprising, for example, particles of carbon black or a mix of red, blue, and green pigment particles, measuring between about 0.01 and 0.1 microns, was uniformly dispersed within the resin. Once the applied resin coating was dry it was exposed to suitable actinic radiation 32 (typically light having a wavelength around 4,700 Angstroms), said radiation having passed through mask 33 and then focussed at the resin surface to form of an image of the desired black matrix (two sets of evenly spaced parallel lines orthogonal to one another).

Figure 3B:
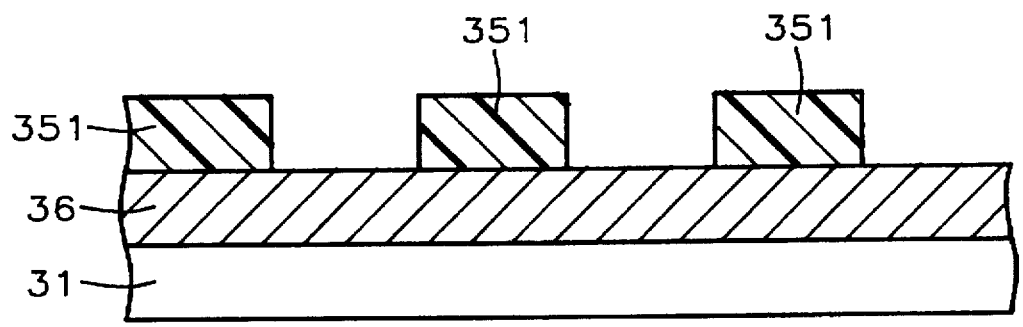
Figure 3C:
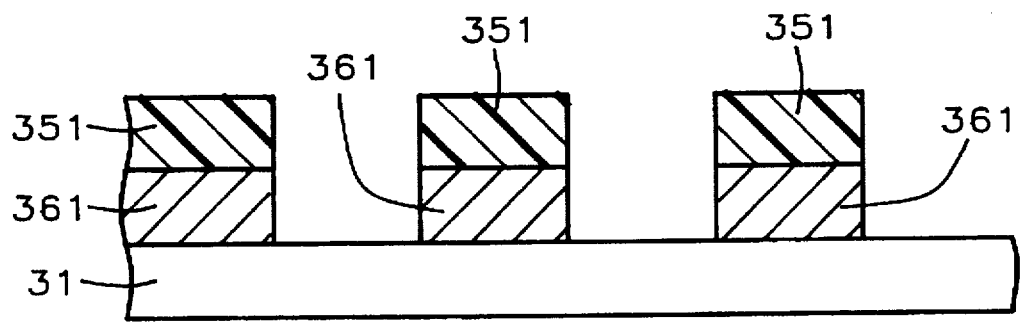

Referring to FIG. 3(b), after exposure, the resin was developed, thereby giving it the shape of the black matrix, shown schematically as 351. This was followed by etching of those parts of the metallic layer that were not covered by the developed resin, thereby completing formation of the black matrix which now comprises lines 351 with underlying lines 361 (in FIG. 3(c)). Referring once more to FIG. 2, the next step is to form the sub-pixel-sized individual color filters such as 3. Substrate 1 is now coated (for example, by spin coating) with a layer of a photosensitive resin in which a colored pigment, for example green, has been dispersed. Then, using standard photolithographic techniques, sub-pixel-sized regions 3 are formed by selectively developing said photosensitive resin. This is repeated at least twice more using different colored pigments, such as blue and red for example, to form additional sub-pixel areas. It will be understood by those skilled in the art that different sets of sub-pixel-sized regions of resin in which different colored pigments have been dispersed could have been used without departing from the spirit of the present invention. Note that, as seen in FIG. 2, the black matrix 15-16 underlies the area that separates each of the sub-pixel-sized regions.

Once the sub-pixel-sized regions have been formed, an overcoat layer 7 comprising polyimide or polyacrylic is deposited to a thickness of about one micron so as to cover both the sub-pixels as well as the separation areas between them. This is followed by the deposition of a transparent, electrically conductive, layer 8 of ITO to a thickness between about 1,000 and 3,000 Angstrom units.

The full LCD is completed by adding additional structures such as an upper substrate (not shown) on whose lower surface has been formed the means for generating an electric field normal to said lower surface and confined to a single sub-pixel, a layer of liquid crystal 9 between the two substrates, and entrance and exit polarizers (also not shown).

Figure 4:
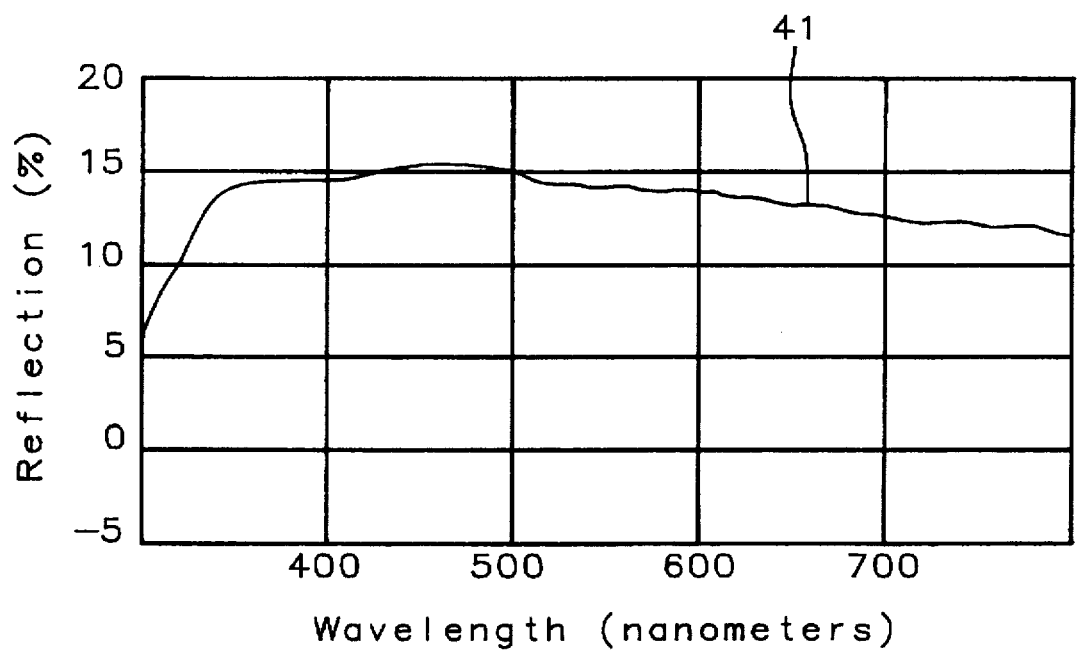
FIGS. 4 and 5 are curves of percent reflection vs. wavelength for black matrices of the present invention and the prior art respectively.
Figure 5:
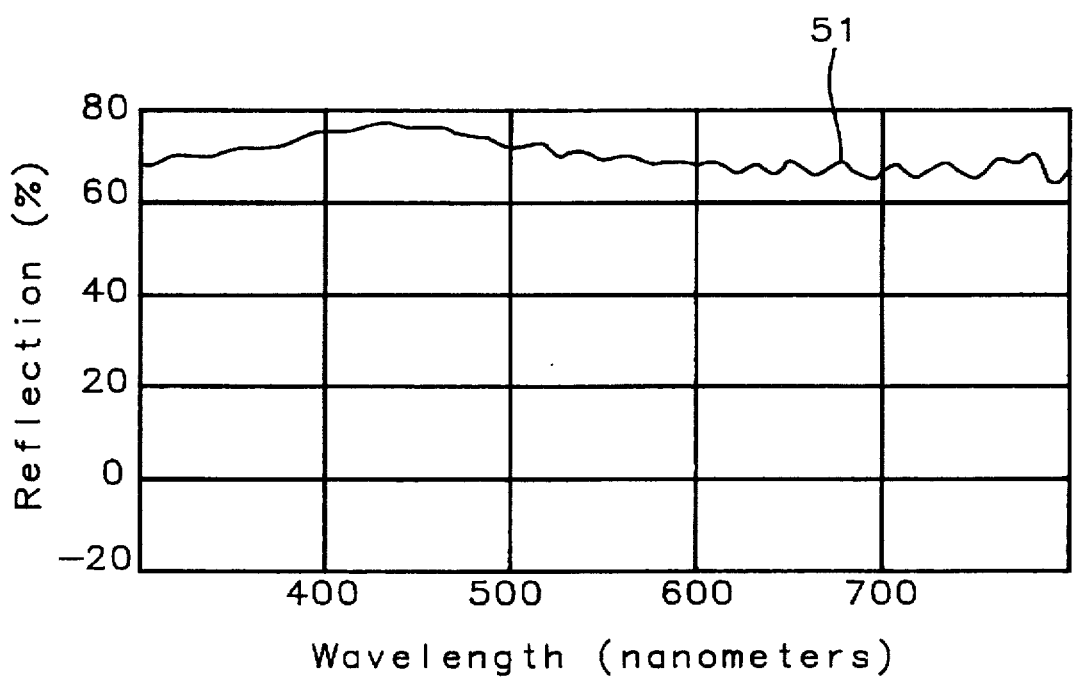

To confirm the effectiveness of the present invention, measurements were taken of the percent reflection of light, in the visible and near visible spectral range, from the top surface of a black matrix that was formed in accordance with the teachings of the present invention. The result is shown as curve 41 of FIG. 4. For comparison, we also show similar data taken on a black matrix of the prior art as curve 51 in FIG. 5.

Experimental data illustrating how the optical properties of the black matrix may be controlled, using the methodology of the present invention, are presented in TABLE I:

TABLE I

| Thickness in Angstroms | | % | |
|---|---|---|---|
| Chromium | Black resin | transmit. | reflect. |
| 200 | 10,000 | 0 | 15 |
| 200 | 5,000 | 1 | 20 |
| 1,500 | 5,000 | 0 | 40 |
| 1,000 | 5,000 | 0 | 60 |

While the invention has been particularly shown and described with reference to the preferred embodiments thereof, it will be understood by those skilled in the art that various changes in form and details may be made without departing from the spirit and scope of the invention.

What is claimed is:

1. A method for making a black matrix in a liquid crystal display comprising:
   (a) providing a transparent insulating substrate having an upper surface;
   (b) depositing a metallic layer on said upper surface;
   (c) applying a layer of a photosensitive resin, in which has been dispersed a black pigment, on said metallic layer;
   (d) exposing said photosensitive resin to an actinic radiation image of the black matrix;
   (e) developing the exposed photosensitive resin;
   (f) etching all parts of said metallic layer not covered by developed photosensitive resin, therby forming the black matrix;
   (g) coating said substrate upper surface and said black matrix with a layer of a photosensitive resin in which a colored pigment has been dispersed;
   (h) selectively exposing sub-pixel-sized regions of said photosensitive resin, in which a colored pigment has been dispersed, to actinic radiation and then developing said photosensitive resin;
   (i) coating said upper surface, including any exposed resin, with a layer of photosensitive resin in which has been dispersed a pigment of a color different from any already present on said upper surface, and then repeating step (h);
   (j) repeating step (i) one or more times;
   (k) depositing an overcoat layer; and
   (l) depositing a transparent, electrically conductive, layer.

2. The method of claim 1 wherein the thickness of said metallic layer is between about 200 and about 2,000 Angstroms.

3. The method of claim 1 wherein the thickness of said layer of photosensitive resin is between about 0.1 and 1 microns.

4. The method of claim 1 wherein said black pigment comprises particles of carbon black having an average diameter between about 0.01 and about 0.1 microns.

5. The method of claim 1 wherein the thickness of said layer of transparent, electrically conductive, material is between about 0.1 and about 0.3 microns.

6. The method of claim 1 wherein said overcoat layer comprises polyimide deposited to a thickness between about 0.5 and 1 microns.

7. The method of claim 1 wherein said layers of photosensitive resin are applied by means of spin coating.

* * * * *